United States Patent
Greubel

(10) Patent No.: US 6,425,302 B2
(45) Date of Patent: Jul. 30, 2002

(54) ROLLING-BODY SCREW DRIVE WITH RADIALLY INSERTED CIRCULATORY ELEMENT

(75) Inventor: Roland Greubel, Ramsthal (DE)

(73) Assignee: Rexroth Star GmbH (DE)

( * ) Notice: Subject to any disclaimer, the term of this patent is extended or adjusted under 35 U.S.C. 154(b) by 0 days.

(21) Appl. No.: 09/808,614

(22) Filed: Mar. 14, 2001

(30) Foreign Application Priority Data

Mar. 16, 2000 (DE) .......................................... 100 12 810

(51) Int. Cl.⁷ .......................... F16H 25/22; F16H 25/24; F16H 1/24; F16H 55/02
(52) U.S. Cl. .................................. 74/424.87; 74/424.82
(58) Field of Search ........................ 74/424.87, 424.81, 74/424.82, 424.86, 89.36, 89.37, 89.38, 441, 459.5; 386/43, 44, 49, 504, 510

(56) References Cited

U.S. PATENT DOCUMENTS

| 2,166,106 | A | | 7/1939 | Gormley ...................... 74/459 |
|---|---|---|---|---|
| 4,750,378 | A | * | 6/1988 | Sheppard |
| 5,373,755 | A | * | 12/1994 | Rohlinger |
| 5,664,459 | A | | 9/1997 | Mühleck et al. ............ 74/424.8 |
| 5,791,192 | A | | 8/1998 | Lee .............................. 74/459 |
| 2001/0022110 | A1 | * | 9/2001 | Greubel ................... 74/424.87 |
| 2001/0025540 | A1 | * | 10/2001 | Greubel ................... 74/424.87 |

FOREIGN PATENT DOCUMENTS

| DE | 2128944 | | 12/1971 |
|---|---|---|---|
| DE | 2412606 | | 9/1975 |
| DE | 2437497 | | 11/1975 |
| DE | 29504812 | | 6/1995 |
| DE | 69307228 | | 7/1997 |
| DE | 10012810 | * | 9/2001 |
| EP | 0586326 | | 3/1994 |
| GB | 806811 | | 12/1958 |
| GB | 1342246 | | 1/1974 |

OTHER PUBLICATIONS

EPO Patent Abstracts of Japan, vol. 1995, No. 10, Nov. 30, 1995, JP 08 174 205.
EPO Patent Abstracts of Japan, vol. 014, No. 019 (M–919), Jan. 1, 1990, JP 01 261 551.

* cited by examiner

Primary Examiner—Douglas C. Butler
(74) Attorney, Agent, or Firm—Baker Botts LLP

(57) ABSTRACT

A rolling-body screw drive includes a threaded spindle and a threaded nut (10) enclosing the threaded spindle, a helically running threaded channel being provided between an outer circumferential surface of the threaded spindle and an inner circumferential surface (24) of the threaded nut (10), the threaded channel forming, together with a return channel (50) which connects the two end regions of the threaded channel, an endless circulatory channel in which an endless series of rolling bodies is accommodated. A deflecting element (32, 34) is mounted in a cutout (28, 30) in the nut adjacent each end region of the threaded channel. Each deflecting element has a deflecting channel (64) for transferring the rolling bodies between the threaded channel and the return channel (50) and between the return channel (50) and the threaded channel. At least one of the cutouts (28, 30) for accommodating the deflecting elements (32, 34) is introduced into the threaded nut (10) from the outer circumferential surface (12) of the nut and is bounded by the threaded nut (10) in both directions running essentially parallel to the longitudinal axis (A) of the threaded spindle. The at least one deflecting element (32, 34) can be secured on the threaded nut (10) by fastening pins (72, 74) running essentially parallel to the longitudinal axis (A) of the threaded spindle.

16 Claims, 1 Drawing Sheet

ROLLING-BODY SCREW DRIVE WITH RADIALLY INSERTED CIRCULATORY ELEMENT

BACKGROUND OF THE INVENTION

The invention relates to a rolling-body screw drive having a threaded spindle and a threaded nut enclosing the threaded spindle, a helically running threaded channel provided between an outer circumferential surface of the threaded spindle and an inner circumferential surface of the threaded nut, the threaded channel forming, together with a return channel which connects the two end regions of the threaded channel, an endless circulatory channel in which an endless series of rolling bodies is accommodated, each of the two end regions of the threaded channel being assigned a deflecting element, which is retained in a recess or cutout in the threaded nut and has a deflecting channel, for transferring the rolling bodies between the threaded channel and the return channel and between the return channel and the threaded channel, and in which at least one of the cutouts for accommodating the deflecting elements is introduced into the threaded nut from the outer circumferential surface thereof and is bounded by the threaded nut in both directions running centrally parallel to the longitudinal axis of the threaded spindle.

Such a rolling-body screw drive is known, for example, from U.S. Pat. No. 2,166,106. The disadvantage with the rolling-body screw drive disclosed in this document is, in particular, its high-outlay production. Thus, first of all, it is necessary to produce the through-passage for the threaded spindle, and that part of the threaded channel belonging to the threaded nut has to be formed on the inner circumferential surface of the threaded nut. This machining of the threaded nut takes place essentially in the axial direction of the threaded nut. Then, in a sequence of operating steps carried out essentially in the radial direction, the mounts (cutouts) for the deflecting elements are provided by essentially radially running bores being introduced into the outer circumferential surface of the threaded nut. Furthermore, the deflecting elements of the known rolling-body screw drive are secured on the threaded nut by grub screws. For this purpose, once the deflecting elements have been inserted into the accommodating recesses or bores, it is necessary to introduce a further bore into the threaded nut, this further bore passing through both the boundary surface of the mount and the deflecting element inserted therein. Finally, an internal thread also has to be cut into this further bore.

SUMMARY OF THE INVENTION

The object of the present invention is thus to simplify the production of rolling-body screw drives of the foregoing type.

This object is achieved according to the invention by a rolling-screw drive of the type mentioned in the introduction in which at least one deflecting element is secured on the threaded nut by fastening means, preferably fastening pins, that run essentially parallel to the longitudinal axis of the threaded spindle. With the fastening means thus oriented parallel to the longitudinal axis of the threaded spindle, all of the production steps which have to be carried out on the threaded nut may be carried out in a single chucking fixture for the threaded nut, namely a chucking fixture which allows axial machining of the threaded nut. This simplifies the production of the threaded nut, which, inter alia, reduces the amount of time required for the production process and thus increases the number of threaded nuts produced per unit of time. Furthermore, there is an increase in the accuracy with which the threaded nut can be produced, since a change in the clamping situation with resetting of the workpiece during the production of a component constitutes one of the main causes of inaccuracy of the machined components. It is precisely the case with rolling-body screw drives, however, that the accuracy with which the individual elements, such as threaded spindle and threaded nut, are produced is decisive for the service life of the jointly formed subassembly.

As fastening means, use is preferably made of fastening pins since, for a mount, these merely require a blind hole or a bore, which can be introduced into the threaded nut in just a single operation. In principle, however, it is also possible to use other fastening means, e.g. screws, on the rolling-body screw drive according to the invention.

A straightforward production of the deflecting element is made possible if at least one of the deflecting elements is made up of at least two deflecting-element parts which together bound the deflecting channel. These deflecting-element parts may be designed without undercuts. The associated capacity for straightforward demolding of the deflecting-element parts makes it possible for the deflecting-element parts to be produced by injecting molding.

The deflecting element may, furthermore, comprise a main deflecting-element part, which serves, for example, for the fastening of the deflecting element on the threaded nut, and at least one secondary deflecting-element part. In this configuration of the deflecting element, it is possible to effect an advantageous separation of functions in the deflecting element. It is thus possible for the main deflecting-element part to be designed appropriately for the stressing conditions so that it can effectively absorb forces stemming from the fastening of the deflecting element on the threaded nut. It is likewise possible for the secondary deflecting-element part to be designed in a suitable manner particularly for the guidance of rolling bodies. For example, the divided design of the deflecting element allows the use, appropriate for the stressing conditions, of different materials for the deflecting-element parts.

The main deflecting-element part may advantageously be designed such that the fastening means pass through the main deflecting-element part. This further simplifies the production of the deflecting elements since through-passage openings which can be produced straightforwardly in just one operation, e.g. bores, are sufficient for the through-passage of a fastening component.

If, as a result of the fastening of the main deflecting-element part on the threaded nut, at least one secondary deflecting-element part is retained on the threaded nut by the main deflecting-element part, the secondary deflecting-element part may thus be relieved of all fastening functions and, accordingly, need not be provided with its own fastening means for fastening on the threaded nut. This reduces the number of operating steps required for producing the secondary deflecting-element part.

It is also possible for the deflecting element to be designed as a single part, with the deflecting channel running entirely in the interior of the deflecting element. It is also possible in this case to achieve the abovementioned advantages in the fastening of the deflecting element if there is provided a retaining element which secures the deflecting element in the mounting recess or cutout. For the reasons which have already been mentioned, it is advantageous here if the fastening means pass through the retaining element.

Particularly straightforward production of a rolling-body screw drive of the generic type is possible when the recess or cutout for accommodating the deflecting elements on the threaded nut comprises two surfaces running essentially orthogonally to the longitudinal axis of the threaded spindle and two concave surfaces which are essentially parallel to the longitudinal axis of the threaded spindle. An opening is provided between the essentially orthogonally running surfaces and between the two concave surfaces, and the helically running threaded channel is accessible through such opening. Such a cutout may be produced, for example, in a straightforward manner by milling, for example using a side-milling cutter, with the machine spindle which drives the milling cutter, in turn, running essential parallel to the longitudinal axis of the threaded spindle of the rolling-body screw drive. Although the cutouts for accommodating the deflecting elements are usually machined from both end sides, it is nevertheless possible, for example, to use a clamping device, which can be rotated through 180°, in a chucking fixture to produce them with the bores which are to be introduced into the threaded nut, without the workpiece having to be reset in the clamping device in the process. As a feature of the invention, it is thus possible not just for the deflecting elements to be fastened on the threaded nut in the axial direction, but, irrespective of this, also for the mounts for the deflecting elements to be introduced into the threaded nut in the axial direction It should be also be added that, in order to produce the mounts for the deflecting elements, it is also possible to use a grinding process in addition, or as an alternative, to milling.

Depending on the tool which is used for machining the threaded nut of the rolling-body screw drive, collisions with tool and/or machine parts may occur during the production of the threaded nut. For example, the shank of the side-milling cutter may collide with the outer circumferential surface of the threaded nut, with the result that the side-milling cutter cannot penetrate into the threaded nut sufficiently deeply to produce a functional mount therein. Such collisions, in which both the tool used and the workpiece may be destroyed or at least damaged, can be prevented, for example, in that recesses for tool and/or machine parts may be provided on the threaded nut.

During the operation of the rolling-body screw drive, the threaded nut may be connected to a moveable component, for example a carriage or a ram, in a straightforward manner by means, for example, of a threaded extension at at least one of its longitudinal ends.

As has already been mentioned above, the deflecting-element parts may be produced, for example injection molded, from plastic. This allows straightforward and cost-effective production of the deflecting-element parts with the same high level of production accuracy.

Furthermore, the rolling bodies used in the rolling-body screw drive may be balls. Balls are preferably used in rolling-body screw drives since, in contrast to other rolling bodies, they do not have a preferred rolling direction which would have to be taken into account in the design of the rolling-body channel.

BRIEF DESCRIPTION OF THE DRAWING

The present invention is explained in more detail hereinbelow with reference to the attached drawing, in which.

DETAILED DESCRIPTION OF EXEMPLARY EMBODIMENT

Figure 1:
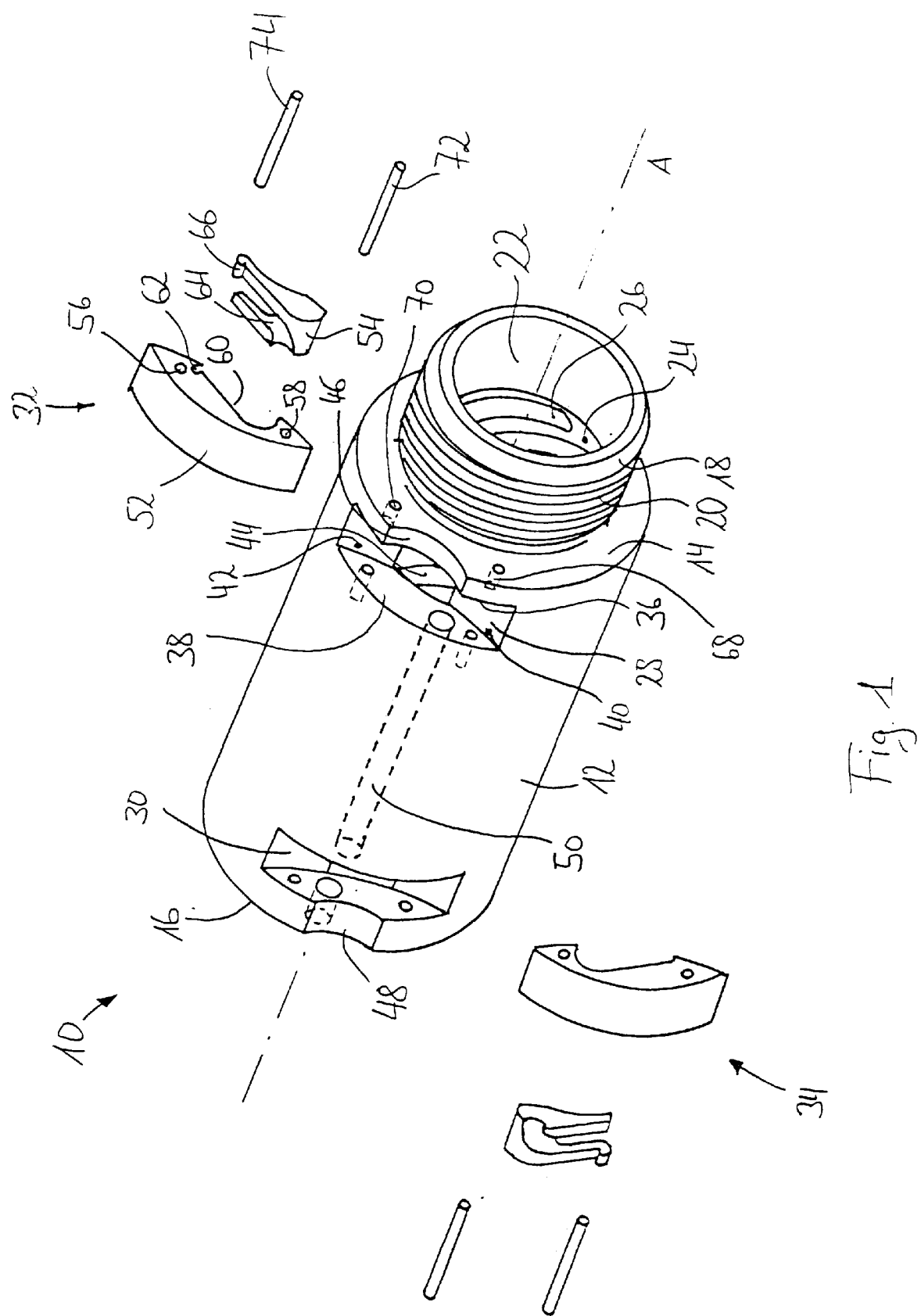
FIG. 1 illustrates a perspective view, in exploded form, of a threaded nut of a rolling-body screw drive according to the invention.

In FIG. 1, a threaded nut of a rolling-body screw drive according to the invention is designated in general terms by 10. The threaded nut 10 is designed as a circular cylinder which is rotationally symmetrical about the central axis A and has an outer circumferential surface 12, a front end side 14 and a rear end side 16, which is concealed by the perspective illustration. On the front end side 14, the threaded nut 10 is formed integrally with a threaded extension 18 extending in the direction of the axis A. The threaded extension 18 has a thread 20 on its outer casing surface.

Extending through the threaded nut 10 in the direction of the axis A, concentrically with the latter, is a through-passage bore 22 which is bounded in the radial direction by an inner circumferential surface 24 of the threaded nut 10. A helical rolling-body guide path 26 is provided on the inner circumferential surface 24, concentrically with the axis A, and forms, together with a complementary rolling-body guide path which has the same thread pitch and is formed on a threaded spindle (not illustrated), a helically running channel.

Furthermore, the threaded nut 10 has a front recess or cutout 28 and a rear recess or cutout 30 for accommodating a front deflecting element 32 and a rear deflecting element 34, respectively. The cutouts 28 and 30 are introduced into the threaded nut from the outer circumferential surface 12 of the threaded nut 10 by milling, e.g., by use of a side-milling cutter. During the production of the cutouts 28 and 30, the spindle axis of the side-milling cutter is located parallel to the axis A, and the side-milling cutter is advanced into the threaded nut 10 in a direction orthogonal to the axis A in order to carry out the cutting-type machining of the threaded nut.

The front cutout 28 has two boundary surfaces running essentially orthogonally to the axis A, namely a front boundary surface 36, which is concealed by the perspective illustration, and a rear boundary surface 38, and also has, therebetween, two boundary surfaces which connect the front and rear boundary surfaces 36 and 38 and run parallel to the axis A, namely a first concave boundary surface 40 and a second concave boundary surface 42. The boundary surfaces 36, 38 are produced, during the production of the front cutout 28, by in each case one end surface of the side-milling cutter, and the first and second concave boundary surfaces 40 and 42 are produced by the circumferential surface of the side-milling cutter. During the production of the front cutout 28, the side-milling cutter is moved into the threaded nut 10 until its circumferential surface produces a through-passage opening 44 in the casing for connecting the cutout 28 to the through-passage bore 22. The through-passage opening 44 in the casing is thus located between the front and rear boundary surfaces 36 and 38 and between the first and second concave boundary surfaces 40 and 42.

The rear cutout 30 is essential identical to the front cutout 28 as far as configuration and production technique are concerned. The two cutouts 28 and 30 are thus bounded both in the direction of the axis A and in the circumferential direction of the threaded nut 10.

In order to avoid collisions with the shank of the side-milling cutter producing the cutouts 28 and 30, concave material recesses 46 and 48 in the form of circle sectors are provided on the threaded nut 10. The material recess 46 is located between the front end side 14 of the threaded nut 10 and the front orthogonal boundary surface 36 of the front cutout 28. The rear material recess 48 is located between the rear orthogonal boundary surface of the rear cutout 30 and the rear end side 16 of the threaded nut 10.

A return channel 50 is also provided in the threaded nut 10. The return channel 50 is, like the helical rolling-body guide path 26, part of an endless rolling-body guide path formed on a rolling-body screw drive according to the invention. The return channel 50 runs essentially parallel to the axis A from the rear orthogonal boundary surface 38 of the front cutout 28 to the front orthogonal boundary surface of the rear cutout 30. During the production of the return channel 50, a drill is advanced into the threaded nut 10, parallel to the direction of the axis A, from the rear end side 16. The drill spindle is likewise arranged parallel to the axis A in this case.

The endless rolling-body circulatory channel formed in the rolling-body screw drive according to the invention is completed by the deflecting elements 32 and 34, which are to be inserted into the front cutout 28 and the rear cutout 30. The deflecting elements 32 and 34 are of identical design and are inserted into the threaded nut 10 in a state in which they are merely rotated through 180° in relation to one another. It is therefore only the deflecting element 32 which is described hereinbelow.

The deflecting element 32 is formed from a main deflecting-element part 52 and a secondary deflecting-element part 54. Both the main deflecting-element part 52 and the secondary deflecting-element 54 are produced from plastic by injection molding.

The main deflecting-element part 52 has two through-passage channels 56 and 58 which serve for fastening the main deflecting-element part on the threaded nut 10. Furthermore, the main deflecting-element part has, on its side which is oriented in the direction of the axis A during operation, a fit-in recess 60, the contour of which is adapted to the outer configuration of the secondary deflecting-element part 54. In the embodiment shown in FIG. 1, a retaining-nose cutout 62 is also provided, in relation to a plane of symmetry of the main deflecting-element part 52 which is orthogonal to the axis A, merely in half of the main deflecting-element part 52 as part of the fit-in cutout 60, such that the fit-in recess 60 and retaining-nose cutout 62 together form a cutout on the main deflecting-element part 52. However, it is also possible for the retaining-nose cutout 62 to extend over the entire width of the main deflecting-element part 52.

An open deflecting channel 64 is formed on the secondary deflecting-element part 54 such that, when the deflecting element 32 is arranged for operation on the threaded nut 10, the main deflecting-element part 52 and the secondary deflecting-element 54 together bound a rolling-body circulatory channel. With a rolling-body screw drive assembled for operation, this rolling-body deflection channel connects a front end region of the threaded channel to a front end region of the return channel 50. Likewise, a rolling-body deflecting channel in the deflecting element 34 connects a rear end region of the return channel 50 to a rear end region of the threaded channel of the threaded nut 10. Also formed on the secondary deflecting-element part 54, at an end in the vicinity of the threaded channel, is a retaining nose 66 which is intended for engaging in the retaining-nose cutout 62.

The preferred embodiment of a deflecting element 32 which has been described herein allows the main deflecting-element part 52 and secondary deflecting-element 54 to be preassembled. For preassembly of the two deflecting-element parts, the secondary deflecting-element part 54 is fitted into the fit-in recess 60 of the main deflecting-element part 52 such that the retaining nose 66 of the secondary deflecting-element part 54 is located in the retaining-nose cutout 62 of the main deflecting-element part 52. The secondary deflecting-element part 54 is retained on the main deflecting-element part 52 via the connection of retaining nose 66 and retaining-nose cutout 62, with the result that the deflecting element 32 can be inserted in a preassembled state into the front cutout 28 of the threaded nut.

For attaching the deflecting-element part 32 to the threaded nut 10, blind bores 68 and 70 are provided in the threaded nut 10. The blind bores 68 and 70 run into the threaded nut 10, parallel to the axis A, from the front end side 14 and extend beyond the rear orthogonal boundary surface 38 of the front cutout 28. For attaching the deflecting element 32 to the threaded nut 10, the deflecting element 32, as has been described above, is inserted in a preassembled state into the front cutout 28. In this case, the blind bore 68 is aligned with the through-passage channel 58 on the main deflecting-element part 52 and the blind bore 70 is aligned with the through-passage channel 56. Fastening pins 72 and 74 are introduced into the blind bores 68 and 70 from the front end side 14 such that they pass through the main deflecting-element part 52.

In accordance with the above, it is possible for all the bores and cutouts provided in the threaded nut 10 to be produced by cutting techniques with the alignment of the tool spindle remaining constant. The through-passage bore 22, material recesses 46 and 48, the return channel 50 and the blind bores 68 and 70 and the cutouts 28 and 30 for accommodating the deflection elements 32 and 34 are produced by cutting techniques using a tool spindle running parallel to the axis A. The front and rear cutouts 28 and 30, respectively, and the blind bores assigned thereto, are usually machined from the front and rear end sides, respectively, i.e. with the alignment of the tool spindle remaining the same but with the tool rotated through 180°. Using, for example, a manufacturing cell which is customary for such machining operations, or a clamping device which can be rotated through 180°, the threaded nut 10 can be produced quickly and with a high level of accuracy in a chucking fixture. Resetting of the workpiece in the clamping device may thus be dispensed with.

What is claimed is:

1. A rolling-body screw drive, comprising:

a threaded spindle having an axis A of elongation;

a threaded nut carried by the threaded spindle for movement axially therealong;

a helically running threaded channel provided between an outer circumferential surface of the threaded spindle and an inner circumferential surface of the threaded nut;

the threaded channel forming, together with an axially extending return channel in the nut which connects the two end regions of the threaded channel, an endless circulatory channel;

an endless series of rolling bodies accommodated in the circulation channel;

a deflecting element mounted on the threaded nut adjacent each of the two end regions of the threaded channel, each of the deflecting elements having therein a deflecting channel for transferring the rolling bodies between the threaded channel and the return channel and between the return channel and the threaded channel;

a cutout in the threaded nut for accommodating each of the deflecting elements;

at least one of the cutouts for accommodating the respective deflecting element being introduced into the threaded nut from the outer circumferential surface of the nut and being bounded by the threaded nut in both directions running essentially parallel to the longitudinal axis (A) of the threaded spindle; and the at least one respective deflecting element being secured on the threaded nut by fastening means running essentially parallel to the longitudinal axis (A) o f the threaded spindle.

2. The rolling-body screw drive as claimed in claim 1, wherein the fastening means comprise fastening pins.

3. The rolling-body screw drive as claimed in claim 1, wherein at least one of the deflecting elements is made up of at least two deflecting-element parts which together bound the deflecting channel (64).

4. The rolling-body screw drive as claimed in claim 1, wherein at least one of the deflecting elements comprises a main deflecting-element part, by which the deflecting element is fastened on the threaded nut, and an associated secondary deflecting-element part.

5. The rolling-body screw drive as claimed in claim 4, wherein the fastening means pass through the main deflecting-element part.

6. The rolling-body screw drive as claimed in claim 4, wherein, as a result of the fastening of the main deflecting-element part on the threaded nut, the associated secondary deflecting-element part is retained on the threaded nut by said main deflecting-element part.

7. The rolling-body screw drive as claimed in claim 1, wherein there is provided a retaining element which secures the at least one deflecting element in the cutout which accommodates the at least one deflecting element.

8. The rolling-body screw drive as claimed in claim 7, wherein the fastening means pass through the retaining element.

9. The rolling-body screw drive as claimed in claim 1, wherein at least one of the cutouts for accommodating a deflecting element comprises two surfaces running essentially orthogonally to the longitudinal axis (A) of the threaded spindle and two concave surfaces which are essentially parallel to the longitudinal axis (A) of the threaded spindle.

10. The rolling-body screw drive as claimed in claim 1, wherein at least one of the cutouts for accommodating a deflecting element is produced essentially by milling and/or by grinding.

11. The rolling-body screw drive as claimed in claim 10, wherein said milling is carried out by use of a side-milling cutter.

12. The rolling-body screw drive as claimed in claim 10, wherein the threaded nut has recesses for avoiding production-induced collisions with milling or grinding tool and/or tool parts.

13. The rolling-body screw drive as claimed in claim 1, wherein the threaded nut has a threaded extension at at least one of its longitudinal ends for supporting a movable workpiece-engaging component.

14. The rolling-body screw drive as claimed in claim 1, wherein at least one of the deflecting elements is produced from plastic.

15. The rolling-body screw drive as claimed in claim 14, wherein the at least one deflecting element is produced by injection molding.

16. The rolling-body screw drive as claimed in claim 1, wherein the rolling bodies are balls.

* * * * *